(No Model.)
E. B. STUART.
PROCESS OF AND COMPOUND FOR SEPARATING OXYGEN.
No. 588,615. Patented Aug. 24, 1897.
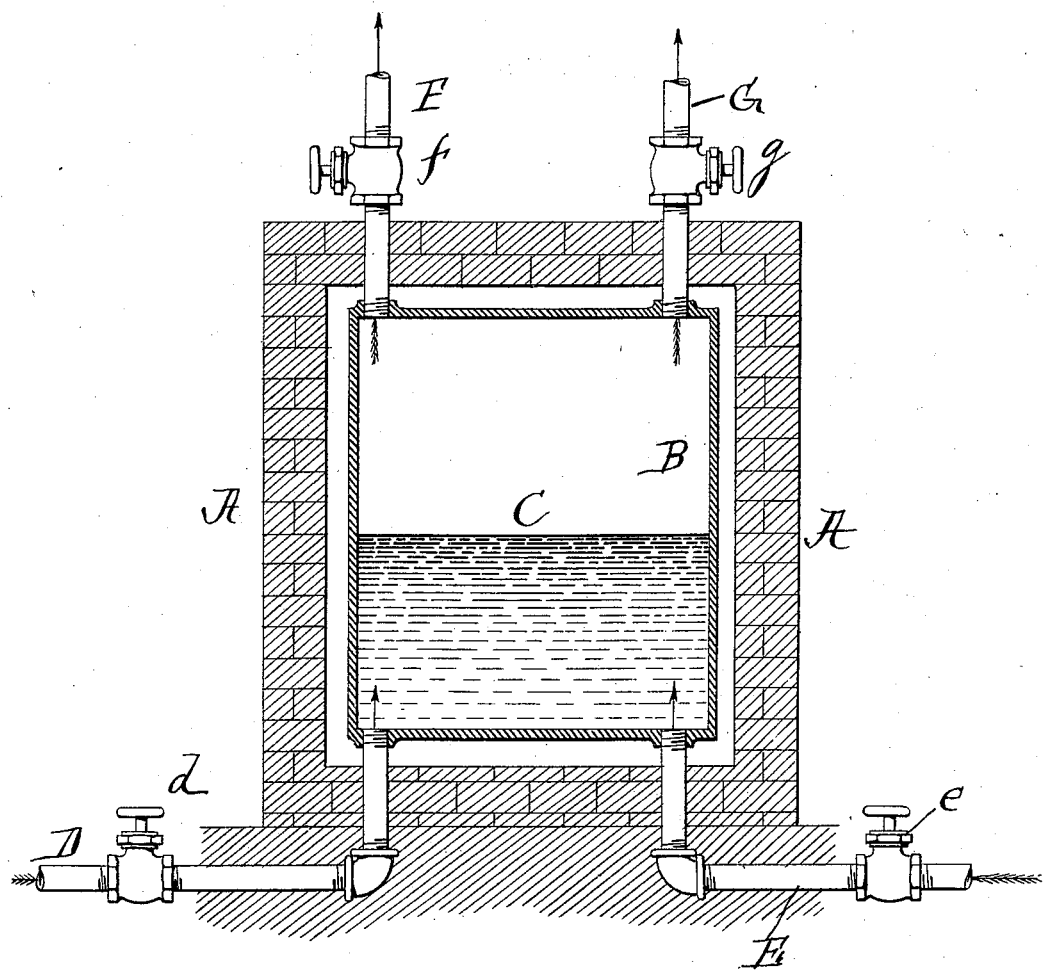

UNITED STATES PATENT OFFICE.

ERNEST B. STUART, OF CHICAGO, ILLINOIS, ASSIGNOR TO THE GENERAL GAS COMPANY, OF SAME PLACE.

PROCESS OF AND COMPOUND FOR SEPARATING OXYGEN.

SPECIFICATION forming part of Letters Patent No. 588,615, dated August 24, 1897.

Application filed February 7, 1896. Renewed December 24, 1896. Serial No. 616,944. (No specimens.)

*To all whom it may concern:*

Be it known that I, ERNEST B. STUART, a citizen of the United States, residing in the city of Chicago, county of Cook, and State of Illinois, have invented certain new and useful Improvements in Chemicals and Methods of Producing and Using the Same for Obtaining Oxygen and Nitrogen, of which the following is a specification.

This invention relates generally to improvements in chemicals and methods of producing the same for obtaining oxygen and nitrogen from air by the use of chemical agents with which oxygen will combine and to which nitrogen is indifferent and therefore passes off, and the oxygen is afterward released when said chemical is subjected to the influence of steam, leaving said chemicals in the form in which they were before having oxygen combined therewith, but more specifically to chemicals and methods of producing the same in which the agents combine with atmospheric oxygen, thereby forming a manganate from which oxygen may be and is evolved by the action of steam.

My discovery includes means and methods by which a manganate, however formed, and the elements of such a manganate, of whatever they may consist, may be permanently maintained in a liquid condition and in the best physical condition for the freest possible access of air and steam to each molecule of any given bulk or mass.

The object of my invention is to maintain in permanent liquid condition during the operation any agent, and particularly any manganate and the elements thereof when said manganate and elements are capable of uniting with and separating oxygen from the nitrogen of atmospheric air, such oxygen to be afterward released by the agency of steam and heat, and thus oxygen and nitrogen may be obtained with commercial success for general use in the arts and manufactures.

In another application, Serial No. 569,946, filed November 23, 1895, I have described and generically claimed the production of a chemical preparation containing manganese and an excess of an alkali capable of fusing and permanently remaining in a liquid form when so fused; also, a process of producing said chemical and a method of separating oxygen and nitrogen from atmospheric air by the use of said chemical preparation and obtaining the oxygen through the action of steam.

My invention and discovery, providing, as it does, for the production of a chemical preparation fusible and capable of permanently remaining in a liquid form when so fused and by which a manganate of any form may be utilized for the separation of the oxygen and nitrogen of atmospheric air, and particularly the former, with commercial success, includes the use of chemicals other than those claimed in my application before referred to, which chemicals, though equivalents in a physical sense, for the purpose of securing permanent liquidity when fused, and thereby providing for the freest possible access of air and steam to every molecule of any bulk or quantity thereof, are not equivalents in a chemical sense, and hence require a separate application for the protection, under the law, of my invention and discovery. In other words, my invention includes the discovery generically of a liquid chemical preparation capable of being maintained permanently in a liquid condition for an indefinite time without change in its physical condition or of its chemical properties and capable of separating oxygen and nitrogen while so maintained, which invention also includes, among other things, the use of any salts, &c., such as calcium, magnesium and sodium chlorids, sulfate of soda, and any other salts which are capable of liquefaction by fusion at or about the temperature at which manganates may be used for separating atmospheric oxygen and nitrogen and which are not decomposed at such temperature.

In carrying out my invention I may first prepare an alkaline manganate in any common and well-known manner and then add the fusible salt employed to secure liquefaction; but it would be no departure from my invention to proceed in any other manner to secure an oxygen absorbing and evolving liquid compound.

The proper proportions of the salt or salts for securing liquefaction vary somewhat, according to the particular salt employed and the temperature at which the operation is conducted. In other words, when the diluent salt represents from fifty to sixty-eight per cent. of the entire weight of the liquid agent satisfactory results are secured, and my operations show that there is no material advantage gained when as high as eighty per cent. of the diluent is present; but as before intimated the proper proportions of the salt or salts added to the manganate are determined in each instance by the liquefaction desired at any predetermined degree of heat at which this liquid is to be used—that is to say, while in theory one pound of chemically-pure manganate will yield one cubic foot of oxygen at each reaction this yield per pound of my liquid agent is decreased in proportion as an excess of salt is added for the purpose of securing fluidity—and hence any greater or less fluidity than is necessary for a maximum free exposure of substantially each and every molecule of the manganate to the action of air and steam is of no advantage.

In practicing my invention the manganate is placed in a suitable vessel or retort capable of being closed, the salt or salts added, and the temperature raised to the point necessary to produce liquefaction, in which condition the liquid agent is ready for use.

Any suitable retort capable of holding the material at the temperature employed and provided with suitable air and steam inlets for distributing said air and steam through the liquid and with suitable pipe-exits, providing for the collection of the oxygen and also the nitrogen, if desired, may be used, it being understood that my invention is not to be limited by any special retort or other device which may be used for the formation of my liquid agent and its subsequent use.

A suitable retort-furnace is shown in the accompanying drawing, in which—

A indicates a furnace having supported therein by any suitable means a closed retort B, in which at C the liquid chemical is indicated. In the bottom of this retort opens an air-supply pipe D, provided with a suitable valve $d$, and also a pipe E, provided with a suitable valve $e$ for supplying steam thereto for evolving oxygen.

At the top of the retort is a pipe F, provided with a suitable valve $f$, through which nitrogen may be discharged and conducted to a suitable receptacle, and there is also a pipe G, provided with a suitable valve $g$ for the discharge of oxygen.

In operation in the formation of the manganate the steam-pipe E and the pipe G is closed, whereupon air is supplied from the pipe D and nitrogen discharged through the pipe F. After the manganate is formed the valves $d$ and $f$ are closed and $e$ and $g$ opened for the supply of steam to and the discharge of oxygen from the retort; but, as before stated, any other suitable apparatus capable of permitting the practice of my process may be used.

Having described my invention, what I claim, and desire to secure by Letters Patent, is—

1. A chemical preparation for obtaining oxygen and nitrogen from air, containing the elements of a manganate and a manganate and a neutral salt capable of fusing and remaining in a permanent liquid form when so fused, substantially as described.

2. A chemical preparation containing the elements of a manganate and a manganate and an alkaline salt capable of fusing and remaining in a permanent liquid form when so fused, substantially as described.

3. A chemical preparation containing the elements of a manganate and a manganate together with a chlorid of an alkaline earth capable of fusing, and remaining in a permanent liquid form when so fused, substantially as described.

4. In the herein-described method of obtaining oxygen and nitrogen, the step which consists in subjecting atmospheric air to a fused mixture containing the elements of a manganate together with a neutral salt, substantially as described.

5. The herein-described method of obtaining oxygen and nitrogen, the step which consists in subjecting steam to a fused mixture containing atmospheric air to a manganate together with a salt, substantially as described.

ERNEST B. STUART.

Witnesses:
JNO. G. ELLIOTT,
LAURA B. HOLDERBY.